(12) United States Patent
Norrman et al.

(10) Patent No.: US 8,601,604 B2
(45) Date of Patent: Dec. 3, 2013

(54) VERIFYING A MESSAGE IN A COMMUNICATION NETWORK

(75) Inventors: Karl Norrman, Stockholm (SE); Patrik Salmela, Kirkkonummi (FI); Kristian Slavov, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 229 days.

(21) Appl. No.: 12/991,542

(22) PCT Filed: May 13, 2008

(86) PCT No.: PCT/SE2008/050550
§ 371 (c)(1),
(2), (4) Date: Nov. 8, 2010

(87) PCT Pub. No.: WO2009/139673
PCT Pub. Date: Nov. 19, 2009

(65) Prior Publication Data
US 2011/0055566 A1    Mar. 3, 2011

(51) Int. Cl.
*H04N 7/16* (2011.01)
(52) U.S. Cl.
USPC ............................................................ 726/30

(58) Field of Classification Search
USPC ............................................................ 726/30
See application file for complete search history.

(56) References Cited

U.S. PATENT DOCUMENTS

| | | | |
|---|---|---|---|
| 6,775,704 | B1 | 8/2004 | Watson et al. |
| 6,886,102 | B1 | 4/2005 | Lyle |
| 7,171,202 | B2 | 1/2007 | Chen et al. |
| 2004/0165551 | A1 | 8/2004 | Krishnamurthi et al. |
| 2005/0132060 | A1 | 6/2005 | Mo et al. |
| 2006/0010389 | A1 | 1/2006 | Rooney et al. |
| 2008/0098228 | A1 | 4/2008 | Anderson et al. |

*Primary Examiner* — Jacob Lipman
(74) *Attorney, Agent, or Firm* — Coats & Bennett, P.L.L.C.

(57) ABSTRACT

A method and apparatus for verifying a request for service in a communication network. An authentication node generates a secret and transmits the secret to a node providing a service. The authentication node then receives a request for authentication from a requesting node, and once the requesting node is authenticated, the authorization node sends an identifier for the requesting node and a first token, which is derived using the secret and the identifier. A service providing node subsequently receives a request for service from the requesting node, the request including the identifier for the requesting node and the first token. The service providing node derives a second token using the identifier and the secret. If the first token and the second token match, then the service providing node allows the request, and if the first token and the second token do not match, then the request is refused.

18 Claims, 3 Drawing Sheets

VERIFYING A MESSAGE IN A COMMUNICATION NETWORK

TECHNICAL FIELD

The invention relates to verifying a message in a communication network.

BACKGROUND

A denial-of-service attack (DoS attack) is an unauthorized attempt to make a computer resource unavailable to its intended users. DoS attacks are intended to prevent a network service from functioning, either on a temporary or a permanent basis. There are different ways in which DoS attacks can be performed. A simple DoS attack against a server is to flood it with sufficient random traffic that the links used by the server get too congested for legitimate traffic to pass through, thereby denying the services of the server to legitimate users. Such an attack may render the server unable to handle legitimate traffic altogether, or may render the server's handling of legitimate traffic so slow as to be effectively unusable.

A more elaborate DoS attack can be performed by sending to the server service requests that appear to be legitimate, but may contain forged authentication data. When the server receives a service request, it allocates resources for the request. The number of legitimate service requests required to render a server ineffective is typically much lower than simply flooding the links to the server, as the requests require more server resources to handle.

Problems with preventing or limiting DoS attacks will now be described with reference to the Generic Bootstrapping Architecture (GBA). However, it will be appreciated that these problems can occur in other network architectures.

Referring to FIG. 1, when a User Equipment (UE) 1 wishes to be authenticated in a network, it is mutually authenticated with a Bootstrapping Server Function (BSF) 2 using the Authentication and Key Agreement (AKA) protocol. This authentication takes place over a Ub reference point. The result of the AKA run is a shared secret between the UE 1 and the BSF 2 in the form of a key, Ks. As part of the procedure, the BSF 2 also sends an identifier for the Ks, termed a B-TID, to the UE 1.

When the UE 1 subsequently wishes to use a service provided by a Network Application Function (NAF) 3, it contacts the NAF 3 and sends the B-TID to the NAF 3. The NAF 3 contacts the BSF 2 using a secure channel, and requests NAF-UE specific keys from the BSF 2 to authenticate the UE 1 and protect the communication with the UE 1. As the UE 1 has previously bootstrapped with the BSF 2, the BSF 2 returns a key (Ks_NAF) to the NAF 3. Ks_NAF is derived from Ks, a NAF identifier and some other parameters. All of these parameters are available to the UE 1, so the UE 1 can derive Ks_NAF locally. The NAF 3 and the UE 1 both have knowledge of Ks_NAF, and this can be used to secure communication between the UE 1 and the NAF 3.

One way to circumvent the problem of a DoS that consists of too many legitimate requests is to apply a rate limit on the number of requests received from a certain unit or network segment such as a UE 1. In addition to this it is customary to design the protocols so that the NAF 3 allocates as few resources as possible to a request until it is certain about the identity of the client, and that the request is not part of a DoS attack.

In GBA, the NAF 3 verifies the identity of the UE 1 by requesting the key the UE 1 is expected to use from the BSF 2, and then this key can be used to authenticate the UE 1. A problem with this approach is that if one or more UEs use a random spoofed B-TID and their source addresses, the NAF 3 has to ask the BSF 2 for the corresponding UE-NAF keys, and get a (negative) response, before it can deduce that the request was not legitimate. In addition to this, since the requests are unlikely to use the same source address or B-TID more than once, there is no information that the NAF 3 can use to quickly detect that the requests are bogus. This therefore places a large processing burden on the NAF 3 in formulating requests to the BSF 2, and a large burden on the network in transporting the requests and responses between the NAF 2 and the BSF 3.

Other mechanisms for preventing flooding of a server with legitimate requests are based on a server providing the requesting client with a puzzle to solve before the actual communication begins. Solving the puzzle places a processing burden on the requesting client, which limits its ability to send a large number of requests. A drawback with this approach is that it delays the start of the communication, and that extra roundtrips are required from the protocols. There is therefore a need to authenticate a requesting client with a server that reduces the signalling required between the server and a BSF, and reduces delays in authentication.

SUMMARY

Each device that is authenticated with an authentication and authorization server such as a BSF is provided with a token that is generated using a "colour of the day" and is unique to the device. The colour of the day is also provided to servers that trust the authentication server. When the device requests a service from a server, it provides sufficient information to allow the server to determine if the device is aware of the correct colour of the day, and if so then the request is allowed. The server therefore does not need to contact the authentication server in order to authenticate the device.

According to a first aspect of the invention, there is provided a method verifying a request for service in a communication network. A service providing node receives a secret sent from a trusted authentication node. The secret may be termed a "colour of the day". When the service providing node subsequently receives a request for service from a requesting node, it can take action to authenticate the requesting node without communicating again with the authentication node. The request for service includes an identifier for the requesting node and a first token, which is asserted to have been derived using the identifier and the secret obtained from the trusted authentication node. The service-providing node derives a second token using the identifier and the secret. If the first token and the second token match, then the request for service is verified and the request is allowed. If the first token and the second token do not match, then the request is refused.

As an option, the secret is periodically changed, and the new secret is sent to the service providing node each time the secret is changed. This prevents a malicious third party from eavesdropping on signals between the requesting node and the service providing node and deriving the secret.

The first and second token are optionally derived by hashing (S2, S4) the secret and the identifier for the requesting node.

The first token is optionally derived using a freshness parameter. In order to verify the request for service, the node also generates the second token using the freshness parameter. The freshness parameter may be either a time stamp synchronized between the requesting node and the service providing node, or a counter. The freshness parameter is used to prevent replay attacks and reduces the chances of a malicious third party being able to eavesdrop on the communications and derive requests for service that appear to originate from the requesting node.

In the event of a Denial of Service attack, in which the same requesting node sends many requests for services, the method optionally includes, after determining that the first token and second token do not match, receiving a further request for service from the requesting node and, as a result of the prior determination, dropping the request for service. This allows the service providing node to drop repeated invalid requests for service before any processing resources are consumed in generating a second token and comparing it with the first token.

The method optionally comprises, in the event that the request is refused, taking action to limit a Denial of Service attack, the action being selected from one of implementing dynamic access control for the requesting node and rate-limiting requests received from the requesting node.

The communication network optionally includes a Generic Bootstrapping Architecture.

According to a second aspect of the invention, there is provided a method of verifying a request for service in a communication network. An authentication node generates a secret and transmits the secret to a node providing a service. The authentication node then receives a request for authentication from a requesting node, and once the requesting node is authenticated, the authentication node sends an identifier for the requesting node and a first token, which is derived using the secret and the identifier. A service providing node subsequently receives a request for service from the requesting node, the request including the identifier for the requesting node and the first token. The service providing node derives a second token using the identifier and the secret. If the first token and the second token match, then the service providing node verifies the request for service and allows the request, and if the first token and the second token do not match, then the request is refused.

According to a third aspect of the invention, there is provided an authentication node for use in a communication network. The authentication node is provided with a processor for generating a secret, and a first transmitter for transmitting the secret to a service node. A receiver is also provided for receiving from a requesting node a request for authorisation. A processing function is provided for generating an identifier for the requesting node and a token derived using the identifier and the secret. A second transmitter is provided for sending the identifier and the token to the requesting node. The processing function is optionally arranged to generate the token by hashing the identifier and the secret.

According to a fourth aspect of the invention, there is provided a service providing node for use in a communication network. A first receiver is provided for receiving a secret from a trusted authentication node, which can be stored in a memory. A second receiver is provided for receiving from a requesting node a request for service. The request for service includes an identifier for the requesting node and a first token. The service providing node also has a processor for deriving a second token using the received identifier and the stored secret. The processor is also arranged to compare the first token with the second token. If the first token and the second token match the processor is arranged to allow the request, and if the first token and the second token do not match, the processor is arranged to refuse the request. This allows the service providing node to authenticate the requesting node without needing to refer to the authentication node. The processor is optionally arranged to derive the second token by hashing the received identifier and the stored secret.

As an option, the first and second tokens are further derived using a freshness parameter. The freshness parameter is selected from one of a time stamp synchronized between the requesting node and the service providing node, and a counter. This reduces the chances of a malicious third party being able to eavesdrop on the communications and derive requests for service that appear to originate from the requesting node.

The processor is optionally arranged to, in the event that the request is refused, take action to limit a Denial of Service attack. Such action may include implementing dynamic access control for the requesting node, or rate-limiting requests received from the requesting node.

According to a fifth aspect of the invention, there is provided a service requesting node for use in a communication network. The service requesting node is provided with a first transmitter for sending to an authentication node a request for authentication. A receiver is arranged to receive from the authentication server an identifier for the service requesting node and a token, the token having been derived using the identifier and a secret. The service requesting node is provided with a memory for storing the identifier and the token, and a processor for subsequently generating a request for service. The request for service must include both the identifier and a keyed-Message Authentication Code, where the key is derived from the token. A second transmitter is provided for sending the request for service to a service-providing node. As an option, the key is further derived using a freshness parameter, the freshness parameter being selected from one of a time stamp synchronized between the requesting node and the service providing node, and a counter. This option reduces the chances of a malicious third party being able to eavesdrop on the communications and derive requests for service that appear to originate from the requesting node.

DETAILED DESCRIPTION

Figure 1:
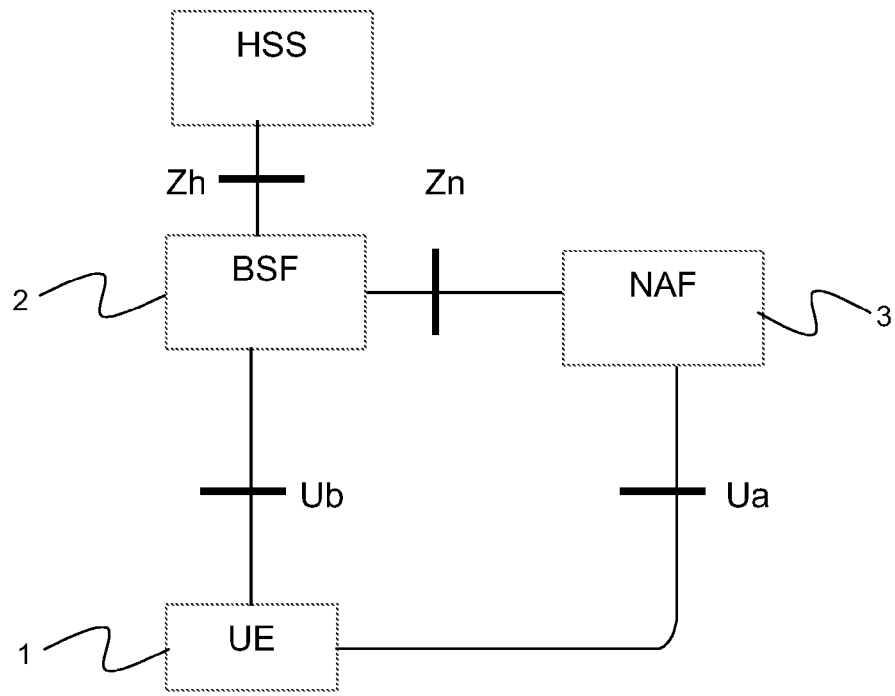
FIG. 1 illustrates schematically in a block diagram a known Generic Bootstrapping Architecture.
Figure 2:
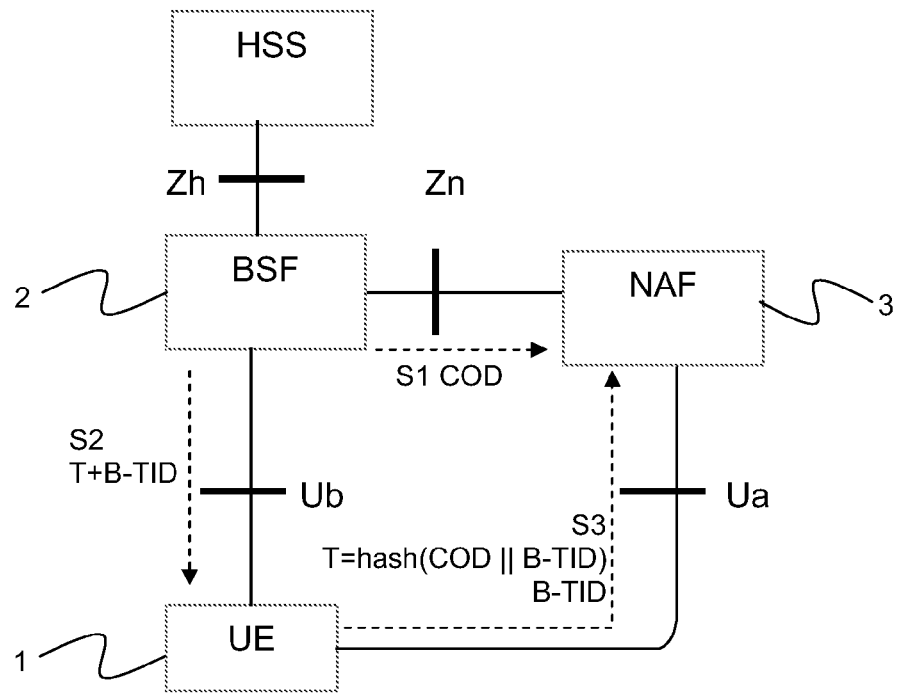
FIG. 2 illustrates schematically in a block diagram signalling in a Generic Bootstrapping Architecture according to an embodiment of the invention.
Figure 3:
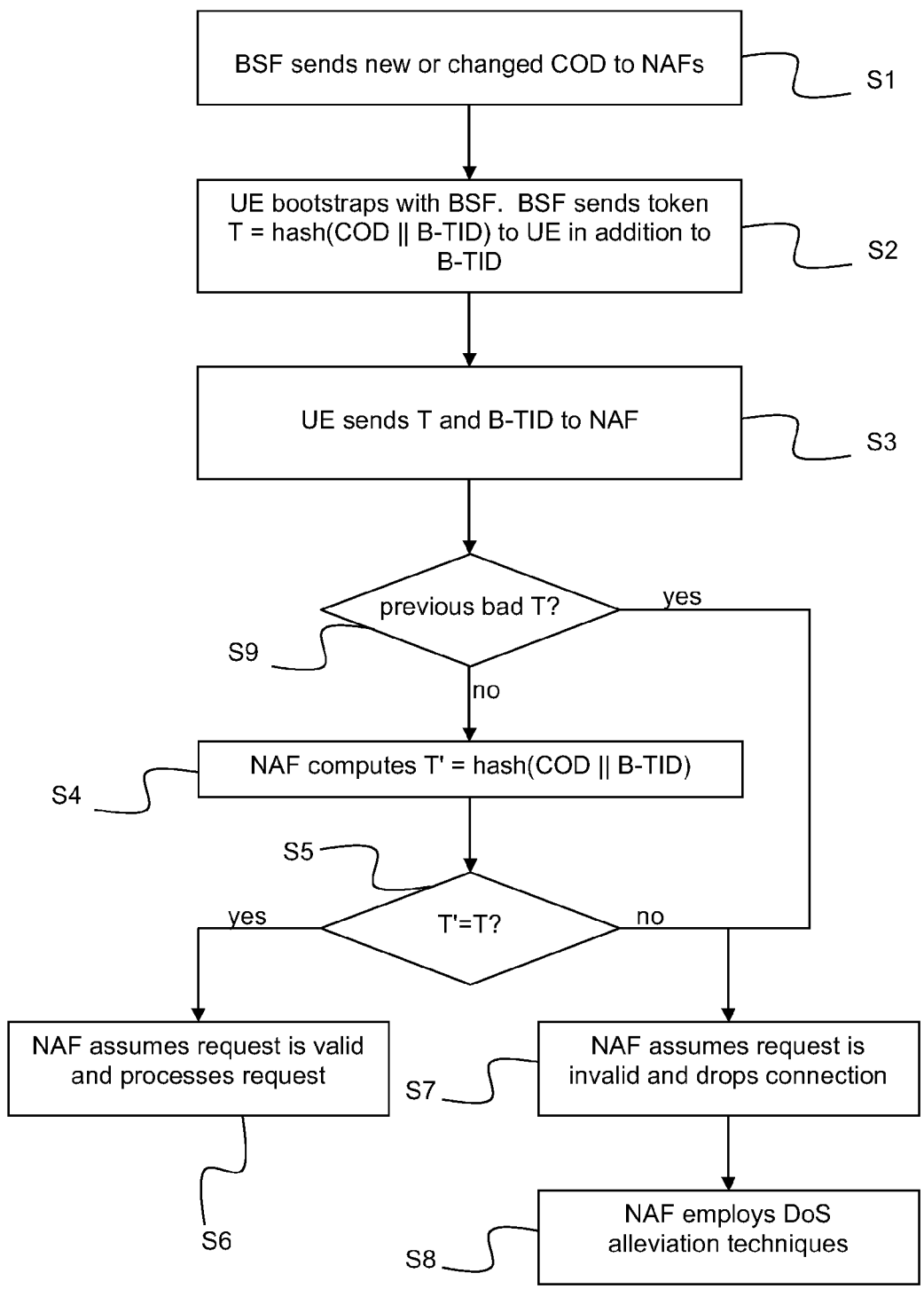
FIG. 3 is a flow diagram showing the steps of an embodiment of the invention.

An embodiment of the invention will now be described with reference to FIGS. 2 and 3. The BSF 2 of FIG. 2 is a server associated with a trusted set of servers, of which the NAF 3 is a member. The NAF 3 therefore trusts communications that it receives from the BSF 2. The following numbering corresponds to FIG. 3.

S1. The BSF 2 distributes a "colour of the day" (COD) to the NAF 3, and to all NAFs in the trusted set of servers. The COD day is typically a bit-string that is only known to the trusted set of NAFs, and is sufficiently long to be virtually impossible to guess. 128 bits is a sufficient length for the colour of the day. The BSF 2 may also periodically change the colour of the day, and update the NAFs with the changed colour of the day once it has been changed.

S2. A UE 1 that wishes to access the NAF 3 service bootstraps with the BSF 2. The BSF 2 sends a token T=hash(COD||B-TID) to the UE 1, in addition to the regular information received during bootstrapping. The token therefore includes both the COD and an identifier for Ks that is shared between the UE 1 and the BSF 2.

S3. The UE 1 sends a request for service to the NAF 3 and provides T and B-TID to the NAF 3.

S4. The NAF 3 computes T'=hash(COD||B-TID). The NAF already knows COD as it has been provided by the BSF 2, and it knows B-TID as the UE 1 has provided this information.

S5. The NAF 3 determines whether T'=T.

S6. If T'=T then the UE 1 is legitimate and the NAF 3 assumes that the request sent from the UE 1 is valid, and so contacts the BSF 2 to get the keys for the UE 1 and provide a service to the UE 1.

S7. If T'≠T, then the NAF 3 assumes that the UE 1 has not authenticated with the BSF, and so drops the connection with the UE 1.

S8. The NAF 3 may now employ various DoS-alleviation techniques, varying from rate-limiting of requests to dynamic access control.

S9. In one embodiment of the invention, if the NAF 3 notices that a certain B-TID is used many times and always in connection with a bad token, it may refrain from performing steps S4 to S7 to preserve its processing resources, and simply reject the request. According to a specific embodiment of the invention, an additional key is generated using a "freshness parameter" and the token T, as described below in order to prevent this step from becoming exploitable by a DoS replay attack.

The COD is related only to initial authentication of a UE 1 to the BSF 2, and so in order to maximize the security of the COD, the COD's lifetime is not linked to the lifetime of session keys Ks and Ks_NAF. If there is a valid Ks between the UE 1 and the BSF 2, the BSF 2 sends a new token (T) to the UE 1 when the COD is changed, and distributes the new COD to all of the trusted NAFs. In an alternative embodiment, the UE 1 will not receive a new token after the COD has changed until it sends a request for service to the NAF 3. As the UE 1 is using a token generated using the previous COD, the request for service is refused by the NAF 3, and this refusal is communicated to the UE 1. As a result of the refusal, the UE 1 re-bootstraps with the BSF 2 to obtain a new token generated using the new COD, and can subsequently use the new token when sending a request for service to the NAF 3.

In an alternative embodiment, each NAF 3 retains one or more old CODs, and if a UE 1 successfully authenticates itself with an old COD, the NAF 3 may then instruct the UE 1 to re-bootstrap with the BSF 2 and get a new token T. This allows a UE 1 to obtain service whilst keeping its security credentials up to date, Ks_NAF need not necessarily expire once the COD is changed, as it does not add any security. Instead, because the NAF 3 and the UE 1 have an established security relationship throughout the session, the NAF 3 periodically negotiates with the UE 1 to alter the session keys in order to provide better security.

Referring again to step S9, it is possible that an attacker may eavesdrop a token and uses it to create messages that appear to come from a legitimate user. In an embodiment of the invention, instead of sending the token derived from the COD and the B-TID, a further token is derived from the token and a freshness parameter. The further token is used to compute a message authentication code (MAC) over the message and/or a freshness parameter. Examples of freshness parameters include a counter or a time stamp. The MAC is then sent from the UE 1 to the NAF 3, along with a request message instead of the token. The MAC varies between the requests, and since the freshness parameter is included in the message, the MAC cannot be re-used. Upon receipt of the message, the NAF computes the token as above, and then computes the MAC-key and verifies the MAC. The freshness parameter must be kept in synch between the NAF and the UE, but this can be done using usual methods.

To further illustrate this, a keyed-Hash Message Authentication Code (HMAC) is a form of MAC commonly used in security protocols. HMAC(msg, key) denotes a function that calculates an HMAC over the message (msg) using (key) as secret key.

Assuming f(x) is a function that generates a secret key using x, and msg denotes an ordinary service request (or other protocol message and/or payload), then at the UE 1:

$$T=\text{hash}(COD\|B\text{-}TID)$$

$$Kt=f(T)$$

The UE 1 then sends to the NAF 3 the following: msg+freshness parameter+HMAC(msg+freshness parameter, Kt) and B-TID At the NAF 3, upon receiving the above mentioned message from the UE 1, the NAF 3 checks that the freshness parameter is valid. If the freshness parameter is not valid, then the NAF 3 ignores the message and need take no further action. If the freshness parameter is valid, the NAF 3 calculates the following:

$$T=\text{hash}(COD\|B\text{-}TID).$$

$$Kt=f(T).$$

The NAF 3 then verifies HMAC(msg+freshness param, Kt). If verification is not successful, then the message is ignored, whereas if verification is successful then the message is processed.

In the event of a DoS attacks, it is important to ensure that the UE 1 is not blacklisted by mistake. A DoS attacker would have to be able to generate Kt in order to fool the NAF into think that the UE 1 is behaving maliciously, which is impossible as long as COD is not available for the attacker.

Figure 4:
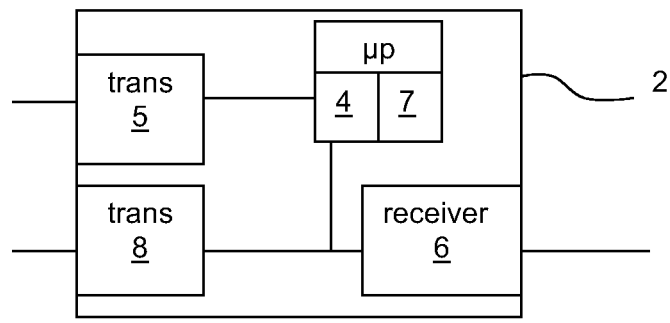
FIG. 4 illustrates schematically in a block diagram an authentication server according to an embodiment of the invention.

Referring now to FIG. 4, an authentication server such as a BSF 2 is illustrated. The BSF 2 is provided with a processing function 4 for generating a colour of the day. A first transmitter 5 is also provided for sending the colour of the day to all NAFs in the trusted group of NAFs. A receiver 6 is provided for receiving a request for authentication from a requesting device such as a UE 1. A second processing function 7 is provided for generating an identifier for the UE 1 and a token, the token being derived by hashing the identifier and colour of the day as described above. Of course, the two processing functions 4, 7 can be implemented in one processor. A second transmitter 8 is also provided for sending the identifier and the token to the UE 1. The first transmitter 5 and the second transmitter 8 may be implemented in a single physical entity.

Figure 5:
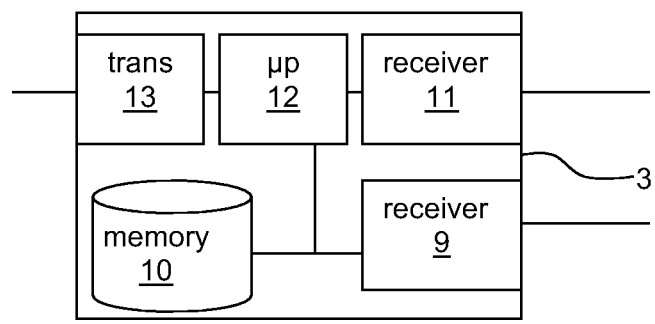
FIG. 5 illustrates schematically in a block diagram a server according to an embodiment of the invention.

Turning now to FIG. 5, there is illustrated a service-providing node such as a NAF 3. The NAF 3 is provided with a receiver 9 for receiving the colour of the day from the trusted BSF 2, and a memory 10 for storing the colour of the day. A second receiver 11 is provided for receiving the request for service from a requesting node such as a UE 1. Of course, the first and second receivers 9, 11 may be implemented in a single physical entity. The request for service, as described above, includes an identifier of the requesting node and a token. A processor 12 is provided for generating a second token using the stored colour of the day and the identifier contained in the request for service. The processor is arranged to compare the received token with the generated token. If the tokens match, then the processor will allow the request, and if the tokens do not match then the processor may take action to limit a Denial of Service attack.

Figure 6:
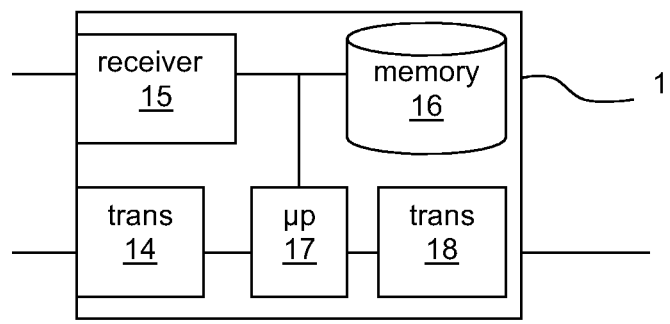
FIG. 6 illustrates schematically in a service-requesting device according to an embodiment of the invention

FIG. 6 herein illustrates a service-requesting device such as a UE 1. The UE is provided with a first transmitter 14 for sending a request for authentication to an authentication node such as a BSF 2. A receiver 15 receives a response to the request, the response including an identifier for the UE 1 and a token, both of which are stored in a memory 16. A processor 17 is provided for generating a request for service, the request for service including the identifier and the token, and a second transmitter 18 is provided for sending the request for service to a service providing node such as a NAF 3. Of course, the first and second transmitters 14, 18 may be implemented in the same physical device.

The invention limits the effectiveness of DoS attacks in which malicious requests are sent to NAFs and/or a BSF, by providing a token that the UE can use with any NAF in the trusted set of NAFs. Different DoS alleviation techniques can be used, for example rate-limiting B-TID, dropping all requests with certain B-TIDs. In some cases, it is not necessary for the NAF to contact the BSF to try to validate the request sender, removing the need for unnecessary signalling.

It will be appreciated by a person of skill in the art that various modifications may be made to the above-described embodiments without departing from the scope of the present invention. For example, whist the invention is described with reference to GBA and a UE, it will be appreciated that the invention can be applied to any type of network in which a device requires a service from one of a number of application servers that are grouped together in a trusted set of servers, for example a server farm.

The following abbreviations have been used in the above description:
AKA Authentication and Key Agreement
BSF Bootstrapping Server Function
COD Colour Of the Day
DoS Denial of Service
GBA Generic Bootstrapping Architecture
NAF Network Application Function
UE User Equipment

The invention claimed is:

1. A method of verifying a request for service in a communication network, the method comprising:
receiving at a service node a secret sent from a trusted authentication node;
receiving at a requesting node a first token sent from the trusted authentication node and derived using the secret and an identifier of the requesting node;
deriving a verification code at the requesting node using the first token and other information;
receiving at the service node a request for service sent from the requesting node, the request comprising at least the identifier of the requesting node, the other information, and the verification code;
deriving a second token at the service node using the received identifier and secret;
verifying the received verification code using the second token and the other information; and
allowing the request for further processing if the verification succeeds, but otherwise refusing the request.

2. The method according to claim 1, wherein the secret is periodically changed, and wherein the method comprises receiving a changed secret from the trusted authentication node.

3. The method according to claim 1, wherein the first and second tokens are each derived by hashing the secret and the identifier of the requesting node.

4. The method according to claim 1, wherein the other information includes a freshness parameter, the freshness parameter for each request comprising either:
a time stamp synchronized between the requesting node and the service node; or
a counter.

5. The method according to claim 1, wherein the other information includes a message part and wherein verifying the received verification code includes verifying the integrity of the message part.

6. The method according to claim 1, wherein allowing the request for further processing comprises limiting a Denial of Service attack by either:
implementing dynamic access control for the requesting node; or
rate-limiting requests received from the requesting node.

7. The method according to claim 1, wherein the communication network includes a Generic Bootstrapping Architecture.

8. The method according to claim 1, wherein the verification code is subsequently used as a key.

9. An authentication node for use in a communication network, the authentication node comprising:
a processor for generating a secret;
a first transmitter for transmitting the secret to a service node;
a receiver for receiving a request for authentication from a requesting node;
a processing function for generating an identifier of the requesting node and a token derived using the identifier and the secret; and
a second transmitter for sending the identifier and the token to the requesting node.

10. The authentication node according to claim 9, wherein the processing function is arranged to generate the token by hashing the identifier and the secret.

11. A service node for use in a communication network, the service node comprising:
a first receiver for receiving a secret from a trusted authentication node;
a memory for storing the secret;
a second receiver for receiving a request for service from a requesting node, the request for service comprising at least an identifier of the requesting node, a verification code, and other information;
a processor for deriving a verification code using the received identifier, the stored secret, and the other information, the processor arranged to:
compare the derived verification code with the received verification code; and
allow the request for further processing if said verification codes match, but otherwise refuse the request.

12. The service node according to claim 11, wherein the other information includes a freshness parameter that comprises either a counter or a time stamp synchronized between the requesting node and the service node, and wherein the processor is arranged to derive the verification code using the freshness parameter.

13. The service node according to claim 11, wherein, if said verification codes match, the processor is arranged to limit a Denial of Service attack by either:
  implementing dynamic access control for the requesting node; or
  rate-limiting requests received from the requesting node.

14. The service node according to claim 11, wherein the processor is arranged to:
  derive a token by hashing the received identifier and the stored secret; and
  derive a verification code using the token and the other information.

15. The service node according to claim 14, wherein, if said verification codes match, the processor is arranged to take action for secure communication with the requesting node using the verification code as a key.

16. A requesting node for use in a communication network, the requesting node comprising:
  a first transmitter for sending a request for authentication to an authentication node;
  a receiver for receiving a token and an identifier of the requesting node from the authentication node, the token having been derived using the identifier and a secret;
  a memory for storing the identifier and the token;
  a processor for generating a verification code using the identifier, the token, and other information; and
  a second transmitter for sending a request for service to a service node, the request comprising at least the identifier, the verification code, and the other information.

17. The requesting node according to claim 16, wherein the other information includes a freshness parameter that comprises either:
  a time stamp synchronized between the requesting node and the service node; or
  a counter.

18. The requesting node according to claim 16, wherein the other information includes a message part and wherein the verification code integrity protects the message part.

* * * * *

UNITED STATES PATENT AND TRADEMARK OFFICE
CERTIFICATE OF CORRECTION

| | |
|---|---|
| PATENT NO. | : 8,601,604 B2 |
| APPLICATION NO. | : 12/991542 |
| DATED | : December 3, 2013 |
| INVENTOR(S) | : Norrman et al. |

It is certified that error appears in the above-identified patent and that said Letters Patent is hereby corrected as shown below:

In the Specification:

In Column 2, Lines 11-12, delete "NAF 2 and the BSF 3." and insert -- NAF 3 and the BSF 2. --, therefor.

In Column 4, Line 52, delete "invention" and insert -- invention. --, therefor.

In Column 5, Line 54, delete "date," and insert -- date. --, therefor.

Signed and Sealed this
Fifteenth Day of July, 2014

Michelle K. Lee
*Deputy Director of the United States Patent and Trademark Office*